US012606149B2

(12) United States Patent
Sekiguchi et al.

(10) Patent No.: US 12,606,149 B2
(45) Date of Patent: Apr. 21, 2026

(54) DRIVE FORCE CONTROL SYSTEM FOR ELECTRIC VEHICLE

(71) Applicant: TOYOTA JIDOSHA KABUSHIKI KAISHA, Toyota (JP)

(72) Inventors: Yoshito Sekiguchi, Kariya (JP); Atsushi Tabata, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/946,400

(22) Filed: Nov. 13, 2024

(65) Prior Publication Data

US 2025/0153702 A1     May 15, 2025

(30) Foreign Application Priority Data

Nov. 15, 2023     (JP) ................................. 2023-194529

(51) Int. Cl.
    *B60W 10/08*          (2006.01)
    *B60W 20/10*          (2016.01)
    *B60K 6/543*          (2007.10)
(52) U.S. Cl.
    CPC ............ *B60W 10/08* (2013.01); *B60W 20/10* (2013.01); *B60W 2710/083* (2013.01)
(58) Field of Classification Search
    CPC ........ B60W 10/08; B60W 20/10; B60K 6/543
    See application file for complete search history.

(56) References Cited

U.S. PATENT DOCUMENTS

| | | | | |
|---|---|---|---|---|
| 6,806,667 B1* | 10/2004 | Sasaki | ................... | B60K 6/547 |
| | | | | 318/434 |
| 2004/0070270 A1* | 4/2004 | Gunji | ........................ | B60L 7/10 |
| | | | | 903/917 |
| 2004/0089485 A1* | 5/2004 | Kramer | ................ | B60K 7/0007 |
| | | | | 180/65.1 |
| 2014/0025241 A1* | 1/2014 | Andou | ................... | B60K 28/16 |
| | | | | 701/22 |

FOREIGN PATENT DOCUMENTS

JP            2001112114 A      4/2001

* cited by examiner

*Primary Examiner* — Tan Q Nguyen
(74) *Attorney, Agent, or Firm* — Hunton Andrews Kurth LLP

(57)                ABSTRACT

A drive force control system for an electric vehicle configured to prevent a temperature rise in a motor to a restrictive temperature, and to ensure running stability of the electric vehicle when the temperature of the motor reaches the restrictive temperature. The control system comprises: an upper limit torque determiner that employs a torque of the first motor as an upper limit torque when a temperature of the first motor reaches a first predetermined temperature, in a case that the temperature of the first motor is higher than a first predetermined temperature but lower than a first restrictive temperature; a restrictive torque determiner that employs a first limit torque as the upper limit torque of the first motor, in a case that the temperature of the first motor reaches the first restrictive temperature; and a target torque determiner configured to determine a torque of another prime mover based on the upper limit torque of the first motor and a target torque ratio between the front wheel and the rear wheel.

4 Claims, 7 Drawing Sheets

Required Driving Torque

Depression of Accelerator Pedal 100%

Vehicle Speed

Depression of Accelerator Pedal 0%

High

Region C

Region E

Region G

T4

T2

Region F

Temperature of Rear Motor

Region A

Region D

Region B

Low

Low    T1 T3    High

Temperature of Front Motor

DRIVE FORCE CONTROL SYSTEM FOR ELECTRIC VEHICLE

CROSS-REFERENCE TO RELATED APPLICATIONS

The present disclosure claims the benefit of Japanese Patent Application No. 2023-194529 filed on Nov. 15, 2023 with the Japanese Patent Office.

BACKGROUND

Field of the Invention

Embodiments of the present disclosure relate to the art of a drive force control system for an electric vehicle having a motor as a prime mover for driving any one of pairs of front wheels and rear wheels, and another prime mover including an engine or a motor for driving the other one of pairs of front wheels and rear wheels.

Discussion of the Related Art

JP-A-2001-112114 describes a four-wheel drive layout vehicle control device including a front motor that drives a pair of front wheels and a rear motor that drives a pair of rear wheels. The control device described in JP-A-2001-112114 is configured to limit output torque of the rear motor to a limit torque determined based on a temperature of the rear motor when the operation of the rear motor is restricted based on the temperature of the rear motor and a temperature of a power storage device. The control device described in JP-A-2001-112114 is further configured to generate a torque calculated by subtracting a torque corresponding to the limit torque of the rear motor from a required drive torque for propelling the vehicle by the front motor. That is, when the torque of the rear motor is restricted, the required driving torque for propelling the vehicle is achieved by reducing the torque of the rear motor to the limit torque and increasing the torque of the front motor.

Thus, the control device described in JP-A-2001-112114 restricts the output torque of the rear motor based on the temperature of the rear motor. For example, when the temperature of the rear motor reaches a predetermined temperature while the vehicle is traveling by the output torque of the rear motor and the front motor based on the target torque distribution ratio to the front wheels and the rear wheels, the torque of the rear motor is reduced. In this situation, the torque of the front motor is increased by a decrease in the torque of the rear motor. As a result, the distribution ratio of the torque to the front wheel and the rear wheel may deviate abruptly and significantly from the target torque distribution ratio thereby reducing the running stability.

SUMMARY

Aspects of embodiments of the present disclosure have been conceived noting the foregoing technical problems, and it is therefore an object of the present disclosure to provide a drive force control system for an electric vehicle configured to prevent a temperature rise of a motor as a prime mover to a restrictive temperature, and to avoid a reduction in a running stability of the electric vehicle when the temperature of the motor reaches the restrictive temperature.

The drive force control system according to the exemplary embodiment of the present disclosure is applied to an electric vehicle comprising: a first motor that drives a first wheel as one of a front wheel and a rear wheel; and another prime mover that drives a second wheel as the other one of the front wheel and the rear wheel. In the electric vehicle, a four-wheel drive mode is available to propel the electric vehicle the first motor and the another prime mover. In order to achieve the above-explained objective, the drive force control system is provided with a controller that controls the first motor. According to the exemplary embodiment of the present disclosure, the controller comprises: an upper limit torque determiner configured to employ a torque of the first motor at a point when a temperature of the first motor reaches a first predetermined temperature as an upper limit torque of the first motor, in a case that the temperature of the first motor is equal to or higher than a first predetermined temperature but lower than a first restrictive temperature set to a level possible to protect the first motor; a restrictive torque determiner configured to employ a first limit torque that is smaller than the torque employed by the upper limit torque determiner and that is set in accordance with the temperature of the first motor as the upper limit torque of the first motor, in a case that the temperature of the first motor is equal to or higher than the first restrictive temperature; and a target torque determiner configured to determine a torque of the another prime mover based on the upper limit torque of the first motor, a target torque ratio between a torque driving the front wheel and a torque driving the rear wheel to achieve a required driving torque to propel the electric vehicle, or the required driving torque.

In a non-limiting embodiment, the another prime mover may include a second motor, and the controller may be further configured to control the second motor. The upper limit torque determiner may be further configured to employ a torque of the second motor at a point when a temperature of the second motor reaches a second predetermined temperature as an upper limit torque of the second motor, in a case that the temperature of the second motor is equal to or higher than the second predetermined temperature but lower than a second restrictive temperature set to a level possible to protect the second motor. The target torque determiner may be further configured to employ the torque of the first motor at the point when the temperature of the first motor reaches the first predetermined temperature as the upper limit torque of the first motor, and employ the torque of the second motor at the point when the temperature of the second motor reaches the second predetermined temperature as the upper limit torque of the second motor, in a case that the temperature of the first motor is equal to or higher than the first predetermined temperature but lower than the first restrictive temperature and that the temperature of the second motor is equal to or higher than the second predetermined temperature but lower than a second restrictive temperature.

In a non-limiting embodiment, the restrictive torque determiner may be further configured to employ a second limit torque that is set in accordance with a temperature of the second motor as an upper limit torque of the second motor, in a case that the temperature of the second motor is equal to or higher than a second restrictive temperature set to a level possible to protect the second motor. In addition, the target torque determiner may be further configured to employ the first limit torque as the upper limit torque of the first motor, and employ the second limit torque as the upper limit torque of the second motor, in a case that the temperature of the first motor is equal to or higher than the first restrictive temperature and that the temperature of the second motor is equal to or higher than the second restrictive temperature.

In a non-limiting embodiment, a manual range mode in which the required driving torque is determined based on a shift range selected from a plurality of ranges is available in the electric vehicle, and the electric vehicle may further comprise a shifting device that is operated by a driver to select the shift range in the manual range mode. In addition, the controller may be further configured to inhibit a shifting operation of the shift range to increase the required driving torque in the manual range mode, in a case that the temperature of the first motor is equal to or higher than the first predetermined temperature and that the temperature of the second motor is equal to or higher than a second predetermined temperature that is lower than a second restrictive temperature set to a level possible to protect the second motor.

Thus, in the case that the temperature of the first motor driving the first wheel is equal to or higher than the first predetermined temperature but lower than the first restrictive temperature, the torque of the first motor at the point when the temperature of the first motor reaches the first predetermined temperature is employed as the upper limit torque of the first motor. According to the exemplary embodiment of the present disclosure, therefore, an increasing rate of the temperature of the first motor may be moderated, and the temperature of the first motor will not be raised higher than the first predetermined temperature. For these reasons, it is possible to prevent a temperature rise in the first motor to the first restrictive temperature.

In a case that the required driving torque is increasing continuously in the situation where the temperature of the first motor is lower than the first predetermined temperature, the torque of the first motor at the point when the temperature of the first motor exceeds the first predetermined temperature is employed as the upper limit torque of the first motor. In this case, the torque of the first motor is maintained to the upper limit torque, and the torque of another prime mover is increased gradually. Then, when the temperature of the first motor exceeds the first restrictive temperature, the torque of the first motor is reduced to the restrictive torque, and the torque of another prime mover is increased continuously. Consequently, an actual ratio between the torque driving the front wheel and the torque driving the rear wheel to achieve the required driving torque to propel the electric vehicle starts deviating moderately from the target torque ratio from the point at which the temperature of the first motor reaches the first predetermined temperature, and further deviates from the target torque ratio at a higher rate after the temperature of the first motor reaches the first restrictive temperature. Thus, according to the exemplary embodiment of the present disclosure, the ratio between the torque driving the front wheel and the torque driving the rear wheel to achieve the required driving torque will not be changed abruptly. For this reason, running stability of the electric vehicle may be ensured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

The control system according to the exemplary embodiment of the present disclosure is applied to an electric vehicle in which one of pairs of front wheels and rear wheels is driven by a motor as a prime mover, and the other pair of front wheels and rear wheels is driven by another prime mover including an engine and a motor. That is, in the vehicle to which the control system according to the exemplary embodiment of the present disclosure is applied, the front wheels and the rear wheels are driven separately by their own dedicated prime movers. In the vehicle, the front wheels may be connected to the front prime mover through a differential mechanism, and the rear wheels may be connected to the rear prime mover through another differential mechanism. In addition, the control system according to the exemplary embodiment of the present disclosure may also be applied to an electric vehicle in which each wheel is provided with a dedicated prime mover respectively. In this case, driving torques and regenerative braking torques of the wheels may be controlled independently. According to the exemplary embodiment of the present disclosure, the definition of the electric vehicle includes a battery electric vehicle, a hybrid electric vehicle, a plug-in hybrid electric vehicle, and a fuel cell electric vehicle.

Figure 1:
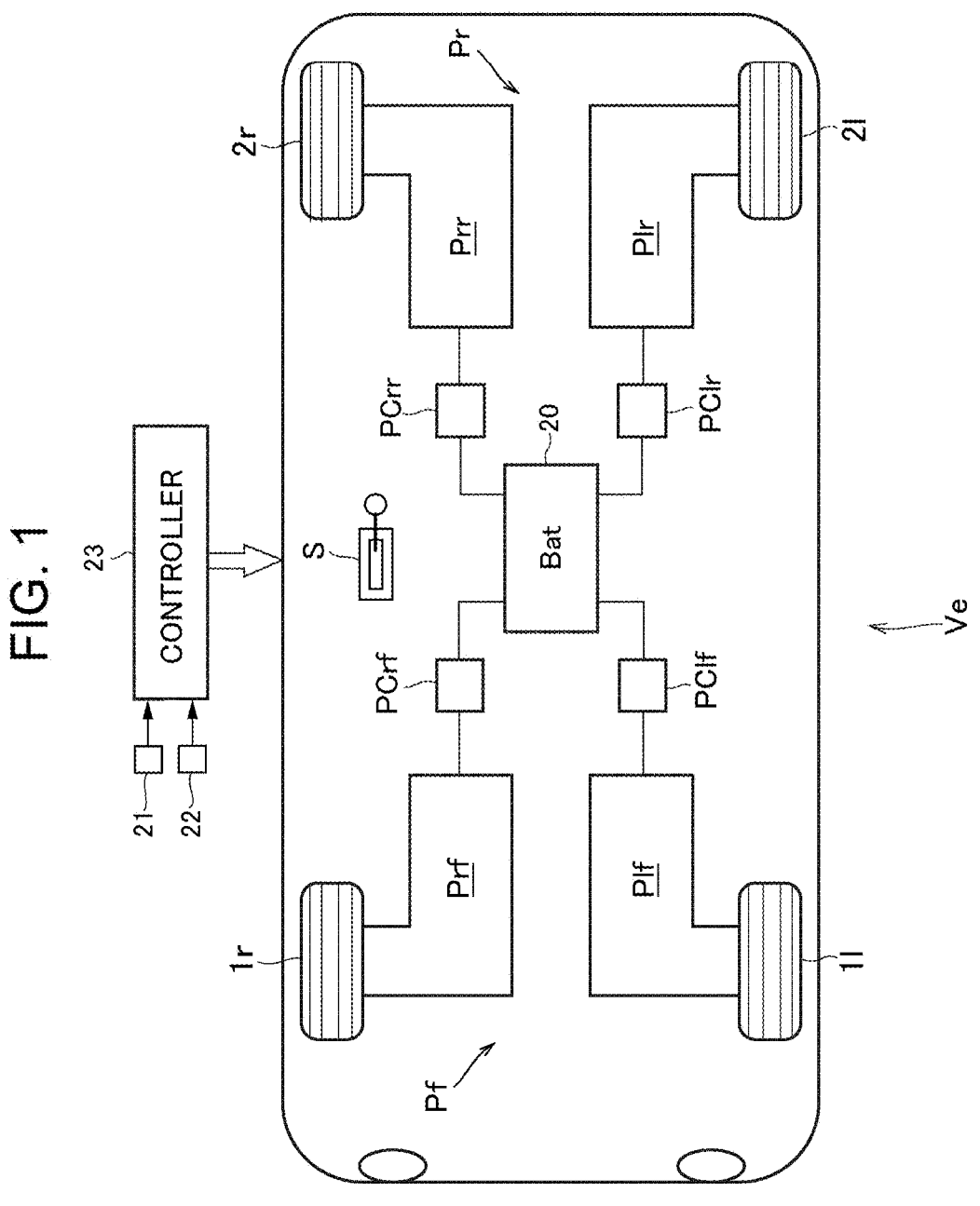
FIG. 1 is a schematic illustration showing one example of a powertrain of a four-wheel independent drive electric vehicle according to the exemplary embodiment of the present disclosure.

Referring now to FIG. 1, there is shown one example of a structure of a four-wheel independent drive layout vehicle to which the control system according to the exemplary embodiment of the present disclosure is applied. In the vehicle Ve shown in FIG. 1, driving torques and regenerative braking torques of wheels may be controlled independently. That is, all of the wheels are driven separately or independently by their own dedicated prime movers. As schematically illustrated in FIG. 1, the vehicle Ve comprises: a pair of front wheels 1r and 1l; a pair of rear wheels 2r and 2l; a front drive unit Pf serving as a prime mover to drive the front wheels 1r and 1l; and a rear drive unit Pr serving as a prime mover to drive the rear wheels 2r and 2l. Each of the front drive unit Pf and the rear drive unit Pr comprises a motor and a geared reduction mechanism (i.e., a transmission mechanism).

Figure 2:
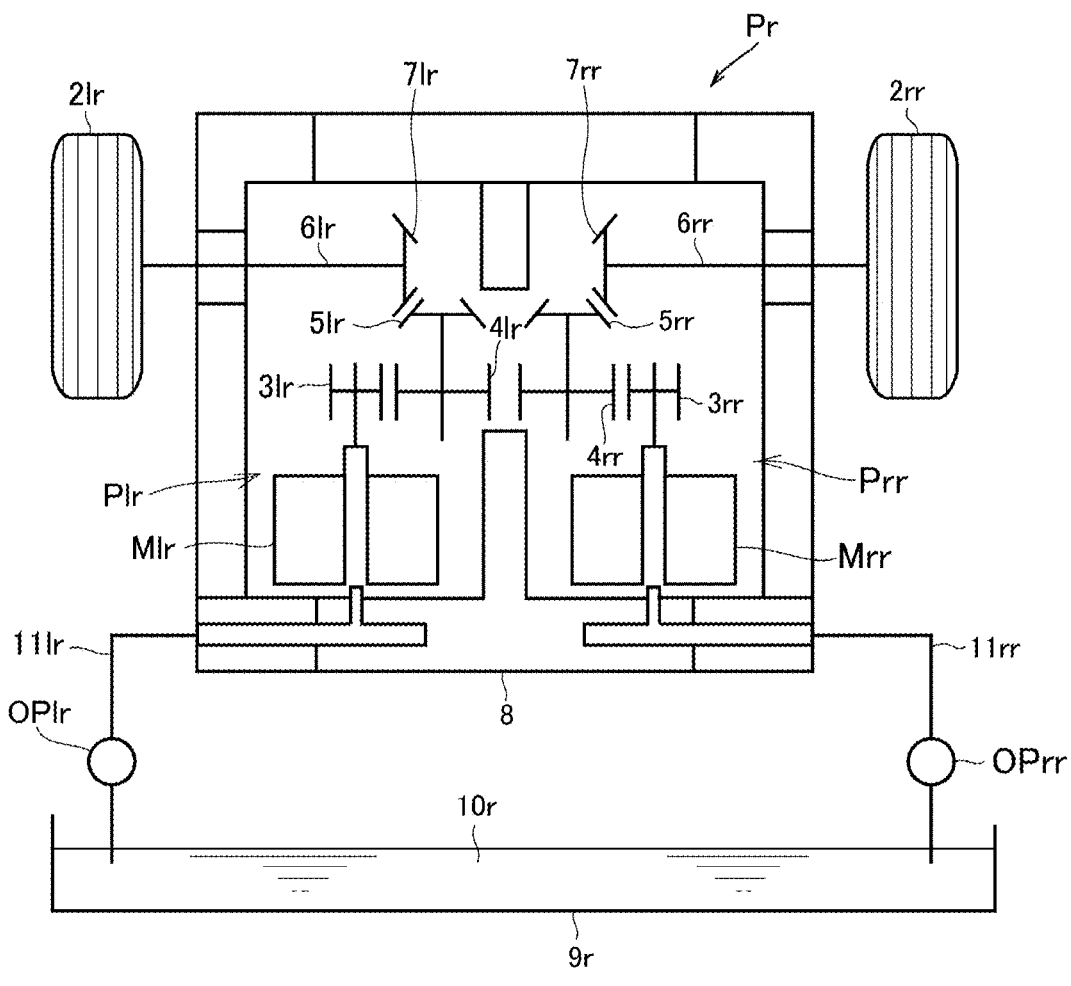
FIG. 2 is a skeleton diagram showing one example of a structure of a rear drive unit.

Turning to FIG. 2, there is shown one example of a structure of the rear drive unit Pr. In the rear drive unit Pr, a pair of drive systems are arranged symmetrically in the horizontal direction to control the right rear wheel 2r and the left rear wheel 2l independently.

In the rear drive unit Pr, specifically, a right rear motor Mrr and a left rear motor Mlr are positioned symmetrically in a manner such that rotor shafts of those motors extend in the longitudinal direction of the vehicle Ve. A right drive gear 3rr is mounted on the rotor shaft of the right rear motor Mrr to be meshed with a right counter driven gear 4rr. Likewise, a left drive gear 3lr is mounted on the rotor shaft of the left rear motor Mlr to be meshed with a left counter driven gear 4lr. A diameter of the right counter driven gear 4rr is larger than a diameter of the right drive gear 3rr, and a diameter of the left counter driven gear 4lr is larger than a diameter of the left drive gear 3lr. That is, a pair of the right drive gear 3rr and the right counter driven gear 4rr serves as a speed reduction mechanism, and a pair of the left drive gear 3lr and the left counter driven gear 4lr also serves as a speed reduction mechanism. A right counter drive gear 5rr is arranged coaxially with the right counter driven gear 4rr to be rotated integrally with the right counter driven gear 4rr, and is meshed with a right driven gear 7rr as a bevel gear formed integrally on a right rear driveshaft 6rr connected to the right rear wheel 2rr. Likewise, a left counter drive gear 5lr is arranged coaxially with the left counter driven gear 4lr to be rotated integrally with the left counter driven gear 4lr, and is meshed with a left driven gear 7lr as a bevel gear formed integrally on a left rear driveshaft 6lr connected to the left rear wheel 2lr. A pair of the right counter drive gear 5rr and the right driven gear 7rr may also serves as a speed reduction mechanism by increasing a diameter of the right driven gear 7rr larger than a diameter of the right counter drive gear 5rr. Likewise, a pair of the left counter drive gear 5lr and the left driven gear 7lr may also serves as a speed reduction mechanism by increasing a diameter of the left driven gear 7lr larger than a diameter of the left counter drive gear 5lr.

The rear motors Mrr and Mlr, the speed reducing mechanisms, and the bevel gears are held liquid-tightly in a casing 8. In order to cool and lubricate the right rear motor Mrr and the left rear motor Mlr by oil 10r, the rear drive unit Pr is provided with a right rear oil pump OPrr and a left rear oil pump OPlr. Each of the right rear oil pump OPrr and the left rear oil pump OPlr is an electric oil pump, and the right rear oil pump OPrr and the left rear oil pump OPlr are rotated to discharge the oil 10r therefrom at a speed based on output torques, rotational speeds, or temperatures of the right rear motor Mrr and the left rear motor Mlr. Instead, the oil 10r may also be supplied to the right rear motor Mrr and the left rear motor Mlr by a common electric oil pump. Specifically, the right rear oil pump OPrr is arranged outside of the casing 8, and the oil 10r held in an oil pan 9r is pumped up by the right rear oil pump OPrr to be supplied to the right rear motor Mrr through a right rear cooling passage 11rr penetrating through the casing 8. Likewise, the left rear oil pump OPlr is also arranged outside of the casing 8, and the oil 10r held in an oil pan 9r is also pumped up by the left rear oil pump OPlr to be supplied to the left rear motor Mlr through a left rear cooling passage 11lr penetrating through the casing 8.

Although not especially illustrated in FIG. 2, the oil 10r supplied to the right rear motor Mrr and the left rear motor Mlr is allowed to flow back to the oil pan 9r from the casing 8. As an option, an oil cooler may be arranged on each of the cooling passages 11rr and 1llr.

Figure 3:
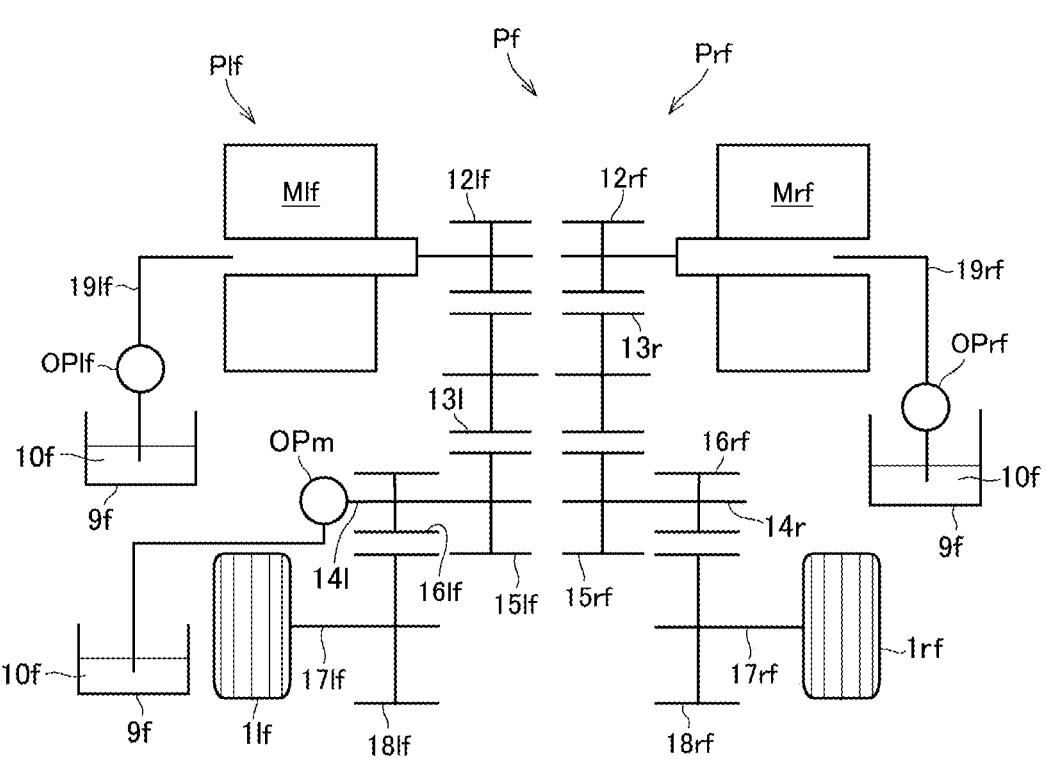
FIG. 3 is a skeleton diagram showing one example of a structure of a front drive unit.

Turning to FIG. 3, there is shown one example of a structure of the front drive unit Pf. In the front drive unit Pf, specifically, a right front motor Mrf and a left front motor Mlf are positioned symmetrically in a manner such that rotor shafts of those motors extend in the lateral (i.e., width) direction of the vehicle Ve. A right drive gear 12rf is mounted on the rotor shaft of the right front motor Mrf to be meshed with a right idle gear 13r, and the right idle gear 13r is also meshed with a right counter driven gear 15rf mounted on a right counter shaft 14r extending parallel to a rotational center axis of the right idle gear 13r. Likewise, a left drive gear 12lf is mounted on the rotor shaft of the left front motor Mlf to be meshed with a left idle gear 13l, and the left idle gear 13l is also meshed with a left counter driven gear 15lf mounted on a left counter shaft 14l extending parallel to a rotational center axis of the left idle gear 13l.

A diameter of the right counter driven gear 15rf is larger than a diameter of the right drive gear 12rf mounted on the rotor shaft of the right front motor Mrf, and a diameter of the left counter driven gear 15lf is larger than a diameter of the left drive gear 12lf mounted on the rotor shaft of the left front motor Mlf. That is, a pair of the right drive gear 12rf and the right counter driven gear 15rf serves as a speed reduction mechanism, and a pair of the left drive gear 12lf and the left counter driven gear 15lf also serves as a speed reduction mechanism. A right counter drive gear 16rf is also mounted on the right counter shaft 14r to be meshed with a right driven gear 18rf formed integrally on a right front driveshaft 17rf connected to the right front wheel 1rf. Likewise, a left counter drive gear 16lf is also mounted on the left counter shaft 14l to be meshed with a left driven gear 18lf formed integrally on a left front driveshaft 17lf connected to the left front wheel 1lf. A diameter of the right driven gear 18rf is larger than a diameter of the right counter drive gear 16rf, and a diameter of the left driven gear 18lf is larger than a diameter of the left counter drive gear 16lf. That is, a pair of the right counter drive gear 16rf and the right driven gear 18rf also serves as a speed reduction mechanism, and a pair of the left counter drive gear 16lf and the left driven gear 18lf also serves as a speed reduction mechanism.

The right front motor Mrf and the left front motor Mlf are also cooled by oil 10f. To this end, the front drive unit Pf is provided with a right front oil pump OPrf and a left front oil pump OPlf. Each of the right front oil pump OPrf and the left front oil pump OPlf is an electric oil pump, and the right front oil pump OPrf and the left front oil pump OPlf are rotated to discharge the oil 10f therefrom at a speed based on output torques, rotational speeds, or temperatures of the right front motor Mrf and the left front motor Mlf. Specifically, the oil 10f pumped up from an oil pan 9f by the right front oil pump OPrf is supplied to the right front motor Mrf through a right front cooling passage 19rf. Likewise, the oil 10f pumped up from an oil pan 9f by the left front oil pump OPlf is supplied to the left front motor Mlf through a left front cooling passage 19lf.

Although not especially illustrated in FIG. 3, the oil 10f supplied to the right front motor Mrf and the left front motor Mlf is allowed to flow back to the oil pan 9f. As an option, an oil cooler may also be arranged on each of the cooling passages 19rf and 19lf. Instead, the oil 10f may also be supplied to the right front motor Mrf and the left front motor Mlf by a common oil pump.

In order to supply the oil 10f to lubrication sites such as gears and bearings, a mechanical oil pump OPm is arranged in the front drive unit Pf. As illustrated in FIG. 3, the mechanical oil pump OPm is connected to the left counter shaft 14*l*. Therefore, the mechanical oil pump OPm is driven during propulsion of the vehicle Ve to pump up the oil 10*f* from the oil pan 9*f*, and the oil 10*f* is delivered to the above-mentioned lubrication sites including gears and bearings.

As illustrated in FIG. 1, an electric storage device (referred to as Bat in FIG. 1) 20 is electrically connected with the front drive unit Pf and the rear drive unit Pr through a power controller PC comprising an inverter. For example, a secondary battery such as a lithium-ion battery, an all-solid battery or the like may be adopted as the electric storage device 20. Whereas, a permanent magnet synchronous motor is adopted as each of the motors Mrf, Mlf, Mrr, and Mlr. That is, motor-generators are adopted as the motors Mrf, Mlf, Mrr, and Mlr. Specifically, the right front motor Mrf is connected with the electric storage device 20 through a right front power controller PCrf, the left front motor Mlf is connected with the electric storage device 20 through a left front power controller PClf, the right rear motor Mrr is connected with the electric storage device 20 through a right rear power controller PCrr, and the left rear motor Mlr is connected with the electric storage device 20 through a left rear power controller PClr. Therefore, output torques and regenerative braking torques of the motors Mrf, Mlf, Mrr, and Mlr may be controlled independently or separately. Here, the output torques and the regenerative braking torques of the motors Mrf, Mlf, Mrr, and Mlr may also be controlled by a common power controller as long as the output torques and the regenerative braking torques of those motors can be controlled independently.

Thus, in the vehicle Ve, the output torques of the motors Mrf, Mlf, Mrr, and Mlr may be controlled independently. Therefore, an operating mode of the vehicle Ve may be selected from a two-wheel drive mode and a four-wheel drive mode. For example, the vehicle Ve may be propelled in the two-wheel drive mode by operating the right rear motor Mrr and the left rear motor Mlr as prime movers while interrupting power supply to the right front motor Mrf and the left front motor Mlf. Whereas, in the four-wheel drive mode, the vehicle Ve is propelled by all of the motors Mrf, Mlf, Mrr, and Mlr. In this case, a ratio between: the output torques of the front motors Mrf and Mlf; and the output torques of the rear motors Mrr and Mlr, may be altered arbitrarily in line with the driver's preference.

The operating mode is selected to control mainly a driving torque in a desired manner. In order to select the operating mode, the vehicle Ve is further provided with a mode selector switch 21 that is operated by a driver. For example, the four-wheel drive mode may be selected from a truck mode, a drift mode, a manual range mode, and a manual sports mode. Specifically, in the truck mode, driving torques and regenerative braking torques of the motors Mrf, Mlf, Mrr, and Mlr are controlled in such a manner as to enhance a turning performance of the vehicle Ve. In the drift mode, torques of the wheels 1*rf*, 1*lf*, 2*rr*, and 2*lr* are controlled separately in such a manner as to reduce an under steering and to optimize tractions of the wheels 1*rf*, 1*lf*, 2*rr*, and 2*lr* thereby enhancing a turning performance and a driving accuracy of the vehicle Ve.

In order to manually change a driving characteristic (i.e., a shift range) as a relation between an operating amount of the accelerator pedal and a required drive torque in the manual range mode or the manual sports mode, the vehicle Ve is provided with a shifting device S such as a shift lever or a paddle shifter. Specifically, in the manual range mode, a position of the shifting device S or an operation of the shifting device S is detected by a shift position sensor 22, and the shift range is changed in accordance with the detection signal of the shift position sensor 22. Whereas, in the manual sports mode, the shift range is changed in response to the operation of the shifting device S so that a large driving torque is ensured to a high-speed range to enhance the acceleration performance or the power performance.

Thus, the operating mode of the vehicle Ve is selected from the above-described operating modes by operating the mode selector switch 21 and the shifting device S. Instead, the normal mode in which an acceleration and an energy efficiency (i.e., an electric milage) of the vehicle Ve are moderated may be selected by operating the mode selector switch 21 and the shifting device S to cancel the selection of the above-described operating modes. For example, the mode selector switch 21 may be adapted to shift the operating mode stepwise each time it is operated. Instead, a plurality of dedicated mode selector switches 21 corresponding to the respective operating modes may also be arranged.

In order to control the motors Mrf, Mlf, Mrr, and Mlr and the electric oil pumps OPrf, OPlf, OPrr, and OPlr in accordance with the selected operating mode and shift range, the vehicle Ve is provided with a controller 23. The controller 23 is composed mainly of a microcomputer, and performs a calculation using incident data and program stored in advance, with reference to maps stored in advance. Results of the calculations are transmitted from the controller 23 to the motors Mrf, Mlf, Mrr, and Mlr and the electric oil pumps OPrf, OPlf, OPrr, and OPlr in the form of command signal.

Figure 4:
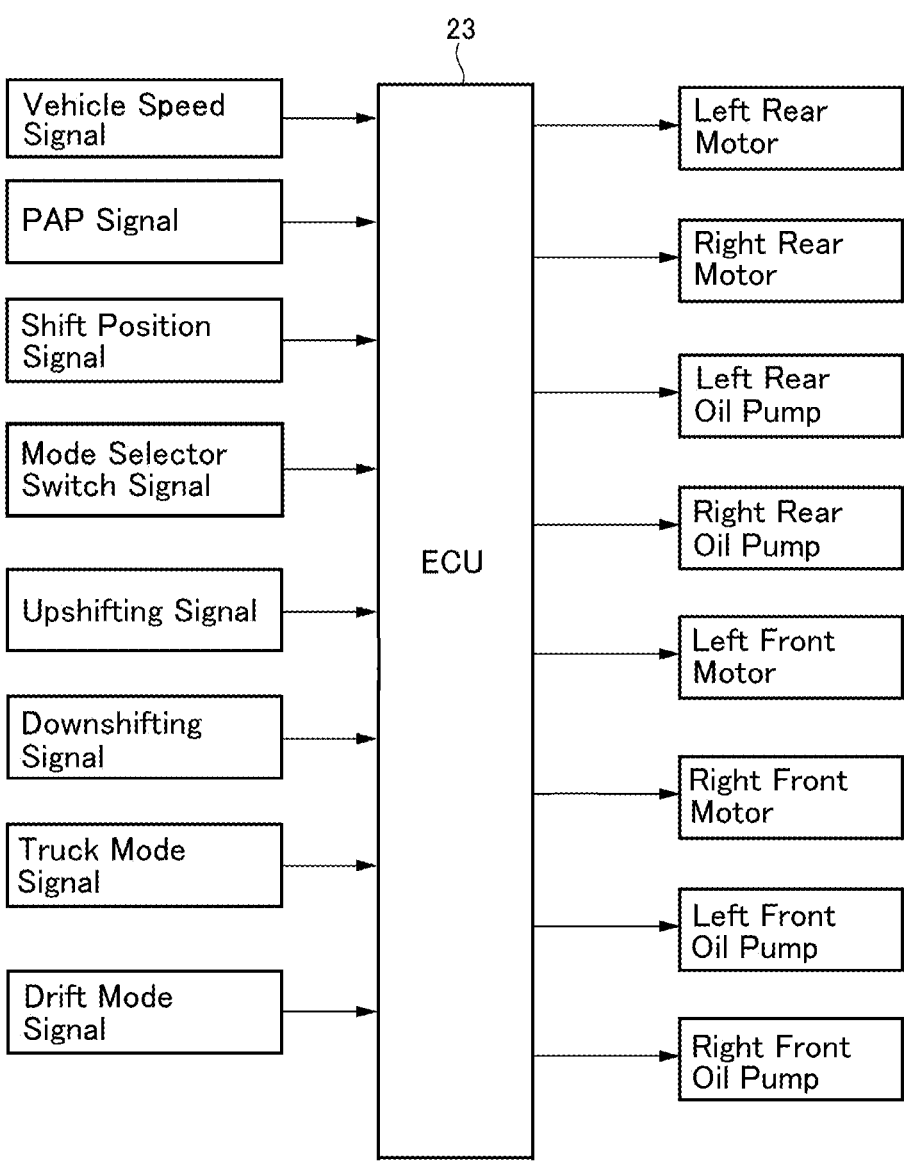
FIG. 4 is a block diagram showing incident signals to a controller and output signals from the controller.

Turning to FIG. 4, there is shown an example of incident signals to the controller (referred to as ECU in FIG. 4) 23 and output signals from the controller 23. As shown in FIG. 4, for example, a vehicle speed signal, an accelerator position signal (referred to as PAP signal in FIG. 4), a shift position signal, a mode selector switch signal, an upshifting signal, a downshifting signal, a track mode signal, a drift mode signal etc. are transmitted to the controller 23. The controller 23 transmits a control signal of the torque of the left rear motor Mlr driving the left rear wheel 2*lr*, a control signal of the torque of the right rear motor Mrr driving the right rear wheel 2*rr*, a control signal of the left rear oil pump OPlr for the left rear wheel 2*lr*, a control signal of the right rear oil pump OPrr for the right rear wheel 2*rr*, a control signal of the torque of the left front motor Mlf driving the left front wheel 1*lf*, a control signal of the torque of the right front motor Mrf driving the right front wheel 1*rf*, a control signal of the left front oil pump OPlf for the left front wheel 1*lf*, a control signal of the right front oil pump OPrf for the right front wheel 1*rf*, and so on.

Figure 5:
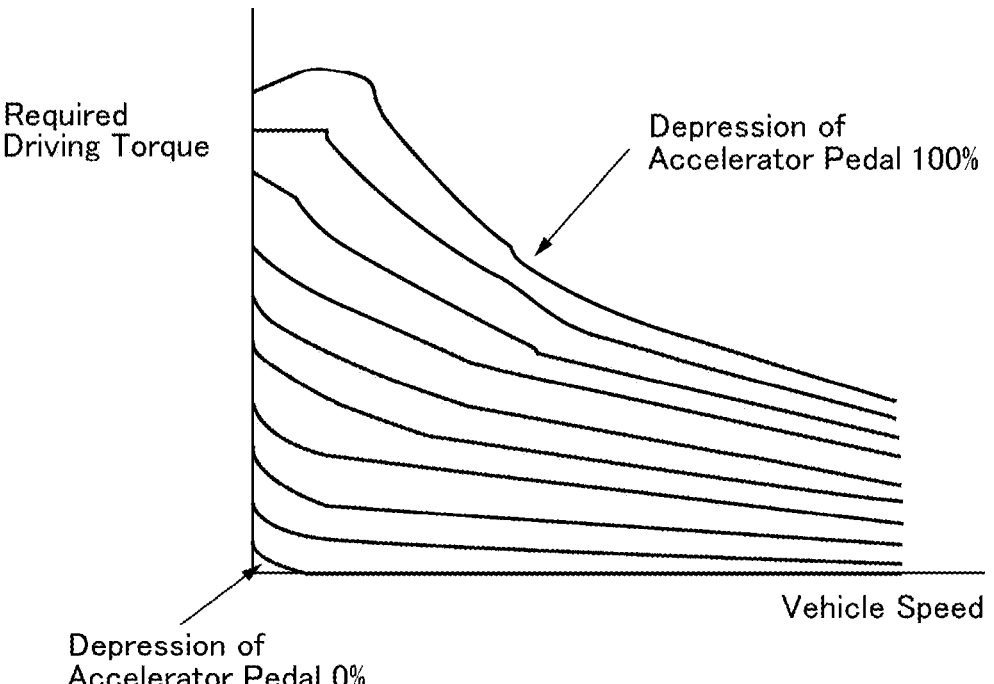
FIG. 5 is a map for determining a required driving torque during propulsion in a drive range.

FIG. 5 shows an example of a driving torque map for determining a driving torque required to propel the vehicle Ve (hereinafter referred to as the required driving torque). The map shown in FIG. 5 is stored in the controller 23, and is configured to determine the required driving torque based on a speed of the vehicle Ve and a position of the accelerator pedal. Specifically, in FIG. 5, the horizontal axis represents the speed of the vehicle Ve, the vertical axis represents the required driving torque, and each curve represents the position of the accelerator pedal. The driving torque map may be configured to differentiate the required driving torque with respect to a predetermined position of the accelerator pedal in accordance with the selected operating mode and shift range. For example, the map shown in FIG. 5 may be configured to increase the magnitude of the required driving torque with respect to a predetermined position of the accelerator pedal in the lower shift ranges during operation in the manual range mode.

Figure 6:
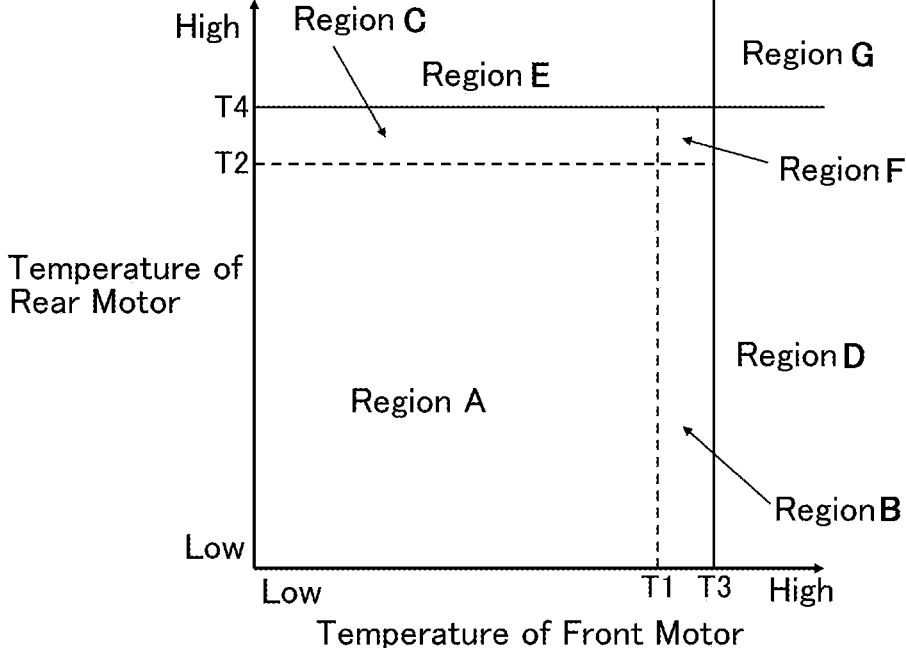
FIG. 6 is a map for determining the torque ratio between the front wheels and the rear wheels based on temperatures of the motors.

In addition, a temperature region map shown in FIG. 6 is stored in the controller 23. The map shown in FIG. 6 is configured to determine a ratio between the torques of the front motors Mrf and Mlf and the torques of the rear motors Mrr and Mlr based on temperatures of the motors Mrf, Mlf, Mrr, and Mlr when the vehicle Ve is operated in the four-wheel drive mode. As described above, the four-wheel drive mode includes the track mode, the drift mode, the manual sports mode, and the manual range mode. In FIG. 6, the horizontal axis represents the temperature of the front motor Mrf or Mlf, and the vertical axis represents the temperature of the rear motor Mrr or Mlr. For example, in a case that the temperature of the right front motor Mrf and the temperature of the left front motor Mlf are different, the higher temperature may be employed to determine the ratio between the torques of the front motors Mrf and Mlf and the torques of the rear motors Mrr and Mlr. Likewise, in a case that the temperature of the right rear motor Mrr and the temperature of the left rear motor Mlr are different, the higher temperature may be employed to determine the ratio between the torques of the front motors Mrf and Mlf and the torques of the rear motors Mrr and Mlr. In the following explanation, the right front motor Mrf and the left front motor Mlf will be commonly referred to as the front motor Mf, and the right rear motor Mrr and left rear motor Mlr will be commonly referred to as the rear motor Mr.

In the map shown in FIG. 6, a region in which the temperature of the front motor Mf is lower than a first predetermined temperature T1 and the temperature of the rear motor Mr is lower than a second predetermined temperature T2 is a region A. In a case that both of the temperatures of the front motor Mf and the rear motor Mr fall within the region A, in order to generate the required driving torque for propelling the vehicle Ve, the ratio between the output torque of the front motor Mf delivered to the front wheels 1rf and 1lf and the output torque of the rear motor Mr delivered to the rear wheels 2rr and 2lr is set to a ratio determined based on e.g., the selected operating mode.

In the map shown in FIG. 6, a region in which the temperature of the front motor Mf is equal to or higher than the first predetermined temperature T1 but lower than a first restrictive temperature T3 and the temperature of the rear motor Mr is lower than the second predetermined temperature T2 is a region B. In a case that both of the temperatures of the front motor Mf and the rear motor Mr fall within the region B, the torque of the front motor Mf at a point when the temperature of the front motor Mf and the temperature of the rear motor Mr enter the region B is set as an upper limit torque of the front motor Mf, and the output torque of the rear motor Mr is adjusted to satisfy the required driving torque. Specifically, the first restrictive temperature T3 is set to a level possible to protect the front motor Mf, for example, to a rated temperature.

In the case that the torque of the front motor Mf is thus limited based on the temperature thereof, the front motor Mf serves as the "first motor" of the embodiment of the present disclosure, the front wheels 1rf and 1lf serve as the "first drive wheel" of the embodiment of the present disclosure, the rear motor Mr serves as the "other prime mover" or the "second motor" of the embodiment of the present disclosure, and the rear wheels 2rr and 2lf serve as the "second drive wheel" of the embodiment of the present disclosure.

Therefore, even if the required driving torque to propel the vehicle Ve is increased in the situation where a point representing the temperature conditions of the front motor Mf and the rear motor Mr which is governed by the temperatures of the front motor Mf and the rear motor Mr (hereinafter, the point representing temperature conditions of the motors Mf and Mr) falls within the region B, the torque of the front motor Mf is fixed to the torque at the time point when the temperature of the front motor Mf enters the region B. In other words, the torque of the front motor Mf is not increased to be greater than the upper limit torque. In this situation, the rear motor Mr is controlled so as to satisfy the required driving torque to propel the vehicle Ve. For this purpose, a torque for driving the front wheels 1rf and 1lf in this situation is calculated by multiplying the torque of the front motor Mf being fixed by a gear ratio of the front drive unit Pf, and a shortage of the torque with respect to the required driving torque to be generated by the rear motor Mr is calculated by subtracting calculated torque for driving the front wheels 1rf and 1lf from the required driving torque. In other words, the required driving torque is satisfied by increasing only the output torque of the rear motor Mr to generate the calculated shortage of the torque.

Given that both of the torques of the front motor Mf and the rear motor Mr are maintained constant after the point representing temperature conditions of the motors Mf and Mr enters the region B, the torque of the front motor Mf and the torque of the rear motor Mr are maintained to the torque at the point when the point representing temperature conditions of the motors Mf and Mr enters the region B. If the required driving torque is reduced in the situation where the point representing temperature conditions of the motors Mf and Mr falls within the region B, the torque of at least one of the front motor Mf and the rear motor Mr is reduced so as to reduce a difference between a target value of the ratio between the torques of the front motor Mf and the rear motor Mr to achieve the required driving torque determined in accordance with e.g., the operating mode (hereinafter, referred to as the target torque ratio) and the actual ratio between the torques of the front motor Mf and the rear motor Mr.

In the map shown in FIG. 6, a region in which the temperature of the rear motor Mr is equal to or higher than the second predetermined temperature T2 but lower than a second restrictive temperature T4 and the temperature of the front motor Mf is lower than the first predetermined temperature T1 is a region C. In a case that both of the temperatures of the front motor Mf and the rear motor Mr fall within the region C, the torque of the rear motor Mr at the point when the temperature of the front motor Mf and the temperature of the rear motor Mr enter the region C is set as the upper limit torque of the rear motor Mr, and the output torque of the front motor Mf is adjusted to achieve the required driving torque. Specifically, the second restrictive temperature T4 is set to a level possible to protect the rear motor Mr, for example, to a rated temperature.

In the case that the torque of the rear motor Mr is thus limited to the upper limit torque, the rear motor Mr serves as the "first motor" of the embodiment of the present disclosure, the rear wheels 2rr and 2lr serve as the "first drive wheel" of the embodiment of the present disclosure, the front motor Mf serves as the "other prime mover" or the "second motor" of the embodiment of the present disclosure, and the front wheels 1rf and 1lf serve as the "second drive wheel" of the embodiment of the present disclosure.

Therefore, even if the required driving torque to propel the vehicle Ve is increased in the situation where the point representing temperature conditions of the motors Mf and Mr falls within the region C, the torque of the rear motor Mr is fixed to the torque at the point when the temperature of the rear motor Mr enters the region C. In other words, the torque of the rear motor Mr is not increased to be greater than the upper limit torque. In this situation, the front motor Mf is controlled to satisfy the required driving torque to propel the vehicle Ve. For this purpose, a torque for driving the rear wheels 2rr and 2lr in this situation is calculated by multiplying the torque of the rear motor Mr being fixed by the gear ratio of the rear drive unit Pr, and a shortage of the torque with respect to the required driving torque to be generated by the front motor Mf is calculated by subtracting calculated torque for driving the rear wheels 2rr and 2lr from the required driving torque. Thus, only the output torque of the front motor Mf is increased in this case to satisfy the required driving torque.

Given that both of the torques of the front motor Mf and the rear motor Mr are maintained constant after the point representing temperature conditions of the motors Mf and Mr enter the region C, the torque of the front motor Mf and the torque of the rear motor Mr are maintained to the torques at the point when the temperature conditions enter the region C. Further, if the required driving torque is reduced in the situation where the point representing temperature conditions of the motors Mf and Mr falls within the region C, the torque of at least one of the front motor Mf and the rear motor Mr is reduced so as to reduce the difference between the target torque ratio determined in accordance with the operating mode and the actual ratio between the torques of the front motor Mf and the rear motor Mr.

In the map shown in FIG. 6, a region in which the temperature of the front motor Mf is equal to or higher than the first restrictive temperature T3 and the temperature of the rear motor Mr is lower than the second restrictive temperature T4 is a region D. In a case that both of the temperatures of the front motor Mf and the rear motor Mr fall within the region D, the output torque of the front motor Mf is restricted to be less than a first limit torque, and the output torque of the rear motor Mr is adjusted to satisfy the required torque to propel the vehicle Ve. The first limit torque is determined based on the temperature of the front motor Mf. For example, the first limit torque may be set to a magnitude by which a heat generation of the front motor Mf is reduced less than cooling capacities of the front oil pumps OPfr and OPfl. Instead, the first limit torque may also be set to the magnitude achieved by shutting down the front power controllers PCfr aand PCfl, i.e., to zero. Accordingly, the first limit torque is less than the upper limit torque set at the point when the temperature of the front motor Mf reaches the first predetermined temperature T1.

In the case that the torque of the front motor Mf is thus limited to less than the first limit torque, the front motor Mf serves as the "first motor" of the embodiment of the present disclosure, the front wheels 1rf and 1lf serve as the "first drive wheel" of the embodiment of the present disclosure, the rear motor Mr serves as the "other prime mover" or the "second motor" of the embodiment of the present disclosure, and the rear wheels 2rr and 2lf serve as the "second drive wheel" of the embodiment of the present disclosure.

Thus, if the torque of the front motor Mf is equal to or greater than the first limit torque when the point representing temperature conditions of the front motor Mf and the rear motor Mr enter the region D, the torque of the front motor Mf is reduced less than the first limit torque. For this purpose, a torque for driving the front wheels 1rf and 1lf in this situation is calculated by multiplying the torque of the front motor Mf reduced to be less than the first limit torque by the gear ratio of the front drive unit Pf, and a shortage of the torque with respect to the required driving torque to be generated by the rear motor Mr is obtained by subtracting the calculated torque for driving the front wheels 1rf and 1lf from the required driving torque.

Likewise, if the required driving torque to propel the vehicle Ve is increased in the situation where the point representing temperature conditions of the motors Mf and Mr falls within the region D, the torque of the front motor Mf is limited to be less than the first limit torque. For this purpose, a torque for driving the front wheels 1rf and 1lf in this situation is calculated by multiplying the torque of the front motor Mf limited to be less than the first limit torque by the gear ratio of the front drive unit Pf, and a shortage of the torque with respect to the required driving torque to be generated by the rear motor Mr is obtained by subtracting the calculated torque for driving the front wheels 1rf and 1lf from the required driving torque.

If the torque of the front motor Mf is less than the first limit torque when the point representing temperature conditions of the motors Mf and Mr enter the region D, or if the required driving torque is maintained or reduced in the situation where the point representing temperature conditions of the motors Mf and Mr falls within the region D, the torques of the front motor Mf and the rear motor Mr are maintained. Instead, the torque of at least one of the front motor Mf and the rear motor Mr is reduced thereby reducing a difference between the target torque ratio and the actual ratio between the torque of the front motor Mf and the torque of the rear motor Mr.

In the map shown in FIG. 6, a region in which the temperature of the rear motor Mr is equal to or higher than the second restrictive temperature T4 and the temperature of the front motor Mf is lower than the first restrictive temperature T3 is a region E. In a case that both of the temperatures of the front motor Mf and the rear motor Mr fall within the region E, the output torque of the rear motor Mr is limited to be less than a second limit torque and the output torque of the front motor Mf is adjusted to achieve the required driving torque. The second limit torque is determined based on the temperature of the rear motor Mr. For example, the second limit torque may be set to a magnitude by which a heat generation of by the rear motor Mr is reduced less than the cooling capacities of the rear oil pumps OPrr and OPrl. Instead, the second limit torque may also be set to the magnitude achieved by shutting down the rear power controllers PCrr and PCrl, i.e., to zero. Accordingly, the second limit torque is less than the upper limit torque set at the time when the temperature of the rear motor Mr reaches the second predetermined temperature T2.

In the case that the torque of the rear motor Mr is thus limited to be less than the second limit torque, the rear motor Mr serves as the "first motor" of the embodiment of the present disclosure, the rear wheels 2rr and 2lr serve as the "first drive wheel" of the embodiment of the present disclosure, the front motor Mf serves as the "other prime mover" or the "second motor" of the embodiment of the present disclosure, and the front wheels 1rf and 1lf serve as the "second drive wheel" of the embodiment of the present disclosure.

Thus, if the torque of the rear motor Mr is equal to or greater than the second limit torque when the point representing temperature conditions of the motors Mf and Mr enters the region E, the torque of the rear motor Mr is reduced to be less than the second limit torque. For this purpose, a torque for driving the rear wheels 2rr and 2lr in this situation is calculated by multiplying the torque of the rear motor Mr thus reduced to be less than the second limit torque by the gear ratio of the rear drive unit Pr, and a shortage of the torque with respect to the required driving torque to be generated by the front motor Mf is obtained by subtracting the calculated torque for driving the rear wheels 2rr and 2lr from the required driving torque.

Likewise, if the required driving torque to propel the vehicle Ve is increased in the situation where the point representing temperature conditions of the front motor Mf and the rear motor Mr falls within the region E, the torque of the rear motor Mr is also set to be less than the second limit torque. For this purpose, a torque for driving the rear wheels 2rr and 2lr in this situation is calculated by multiplying the torque of the rear motor Mr reduced to be less than the second limit torque by the gear ratio of the rear drive unit Pr, and the shortage of the torque with respect to the required driving torque to be generated by the front motor Mf is obtained by subtracting the calculated torque for driving the rear wheels 2rr and 2lr from the required driving torque.

If the torque of the rear motor Mr is less than the second limit torque when the point representing temperature conditions of the motors Mf and Mr enters the region E, or if the required driving torque is maintained or lowered in the situation where the point representing temperature conditions of the motors Mf and Mr falls within the region E, the torques of the front motor Mf and the rear motor Mr are maintained to the current torques. Instead, the torque of at least one of the front motor Mf and the rear motor Mr is reduced thereby reducing a difference between the target torque ratio and the actual ratio between the torque of the front motor Mf and the torque of the rear motor Mr.

In the map shown in FIG. 6, a region in which the temperature of the front motor Mf is equal to or higher than the first predetermined temperature T1 but lower than the first restrictive temperature T3, and the temperature of the rear motor Mr is equal to or higher than the second predetermined temperature T2 but lower than the second restrictive temperature T4 is a region F. In a case that both of the temperatures of the front motor Mf and the rear motor Mr fall within the region F, the torque of the front motor Mf at the point when the temperature of the front motor Mf enters the region F is set as the upper limit torque of the front motor Mf, and the torque of the rear motor Mr at the point when the temperature of the rear motor Mr enters the region F is set as the upper limit torque of the rear motor Mr. Therefore, even if the driving torque required to propel the vehicle Ve is increased in the situation where the point representing temperature conditions of the motors Mf and Mr falls within the region F, the torque of the front motor Mf and the torque of the rear motor Mr are fixed when the point representing temperature conditions of the motors Mf and Mr enters the region F. In other words, the torque of the front motor Mf and the torque of the rear motor Mr will not be increased. In this situation, therefore, the vehicle Ve is propelled by the torque equal to or less than the required driving torque. If the required driving torque is maintained constant in the situation where the point representing temperature conditions of the motors Mf and Mr falls within the region F, the torques of the front motor Mf and the rear motor Mr are maintained constant. By contrast, if the required driving torque is reduced in the situation where the point representing temperature conditions of the motors Mf and Mr falls within the region F, the torque of at least one of the front motor Mf and the rear motor Mr is reduced thereby reducing the difference between the target torque ratio and the actual ratio between the torque of the front motor Mf and the torque of the rear motor Mr.

In the case that the point representing temperature conditions of the motors Mf and Mr falls within the region F, the front motor Mf and the rear motor Mr serve as the "first motor" and the "other prime mover" or the "second motor" of the embodiment of the present disclosure, and the front wheels 1rf and 1lf and the rear wheels 2rr and 2lr serve as the "first drive wheel" and the "second drive wheel" of the embodiment of the present disclosure.

In the map shown in FIG. 6, a region in which the temperature of the front motor Mf is equal to or higher than the first restrictive temperature T3 and the temperature of the rear motor Mr is equal to or higher than the second restrictive temperature T4 is a region G. In a case that both of the temperatures of the front motor Mf and the rear motor Mr fall within the region G, it is necessary to cool the front motor Mf and the rear motor so as to protect these motors. To this end, in a case that the point representing temperature conditions of the front motor Mf and the rear motor Mr falls within the region G, the output torque of the front motor Mf is restricted to the first limit torque or less, and the output torque of the rear motor Mr is restricted to the second limit torque or less. That is, in this case, the driving torque for propelling the vehicle Ve is limited by the first limit torque of the front motor Mf and the second limit torque of the rear motor Mr, even if the driving torque greater than the total of the torque of front motor Mf limited by the first limit torque and the torque of the rear motor Mr limited by the second limit torque is required. In other words, the front motor Mf generates the first limit torque, and the rear motor Mr generates the second limit torque. Whereas, when the required driving torque is reduced to or less than the total of the torque of front motor Mf limited by the first limit torque and the torque of the rear motor Mr limited by the second limit torque, the torque of at least one of the front motor Mf and the rear motor Mr is reduced thereby reducing the difference between the target torque ratio and the actual ratio between the torque of the front motor Mf and the torque of the rear motor Mr.

In the case that the point representing temperature conditions of the front motor Mf and the rear motor Mr falls within the region G, the front motor Mf and the rear motor Mr serve as the "first motor" and the "other prime mover" or the "second motor" of the embodiment of the present disclosure, and the front wheels 1rf and 1lf and the rear wheels 2rr and 2lr serve as the "first drive wheel" and the "second drive wheel" of the embodiment of the present disclosure.

Figure 7:
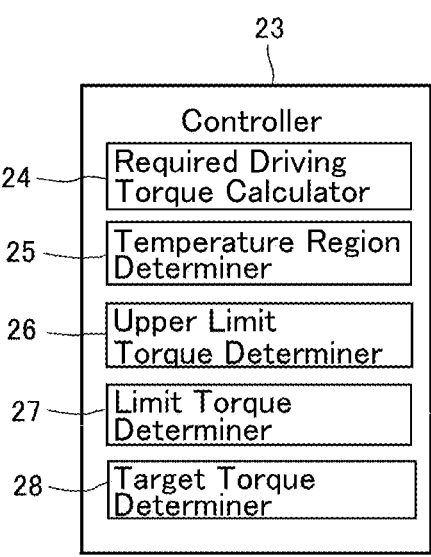
FIG. 7 is a block diagram showing components of the controller.

FIG. 7 shows an example of functional components of the controllers23 for controlling the motors Mrf, Mlf, Mrr, and Mlr. The controller 23 shown in FIG. 7 comprises a required driving torque calculator 24, a temperature region determiner 25, an upper limit torque determiner 26, a limit torque determiner 27, and a target torque determiner 28. The required driving torque calculator 24 is configured to calculate the required driving torque to propel the vehicle Ve based on the vehicle speed signal and the signal representing a position of the accelerator pedal transmitted to the controller 23, and with reference to the above-mentioned driving torque map.

The temperature region determiner 25 is configured to determine a region in the temperature region map within which the point representing temperature conditions of the front motor Mf and the rear motor Mr currently falls. Specifically, the temperature region determiner 25 determines the region within which the point representing temperature conditions of the front motor Mf and the rear motor Mr currently falls based on the signals representing temperatures of the front motor Mf and the rear motor Mr transmitted thereto, and with reference to the temperature region map.

The upper limit torque determiner 26 is configured to set the torques of the front motor Mf and the rear motor Mr as the upper limit torques of the front motor Mf and the rear motor Mr when the point representing temperature conditions of the front motor Mf and the rear motor Mr enter the region B, C, or F.

The limit torque determiner 27 is configured to set the limit torque determined based on the temperatures of the front motor Mf and the rear motor Mr as the upper limit torques of the front motor Mf and the rear motor Mr when the point representing temperature conditions of the front motor Mf and the rear motor Mr enter the region D, E, or G.

The target torque determiner 28 is configured to set the torque of the other motor based on the upper limit torque of at least one of the front motor Mf and the rear motor Mr set by the upper limit torque determiner 26 or the limit torque determiner 27, the driving torque required to propel the vehicle Ve, and the target torque ratio.

Figure 8:
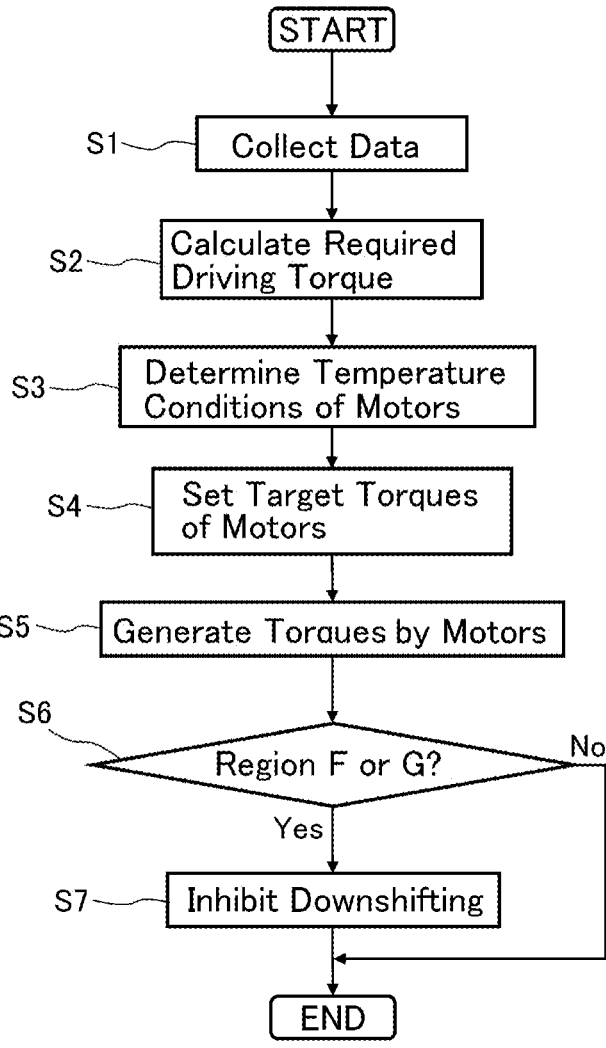
FIG. 8 is a flowchart showing one example of a routine executed by the control system according to the exemplary embodiment of the present disclosure.

Here will be explained an example of the control executed by the controller 23 with reference to a flowchart shown in FIG. 8. At step S1, the controller 23 collects data relating to a position of the accelerator pedal, a speed of the vehicle Ve, temperatures of the front motor Mf and the rear motor Mr, an oil temperature, a selected shift range, a selected operating mode, etc. Then, at step S2, the required driving torque is calculated. At step S2, specifically, the required driving torque is calculated by the required driving torque calculator 24 based on the signal representing the position of the accelerator pedal and the signal representing the speed of the vehicle Ve transmitted to the controller 23, with reference to the driving torque map.

At step S3, a region in temperature region map within which the point representing temperature conditions of the front motor Mf and the rear motor Mr currently falls is determined based on the signal representing the temperature of the front motor Mf and the signal representing the temperature of the rear motor Mr transmitted to the controller 23. Specifically, the temperature region determiner 25 determines whether the temperature of the front motor Mf is equal to or higher than the first predetermined temperature T1 or the first restrictive temperature T3, and whether the temperature of the rear motor Mr is equal to or higher than the second predetermined temperature T2 or the second restrictive temperature T4, and determines the region within which the point representing temperature conditions of the front motor Mf and the rear motor Mr currently falls.

At step S4, the target torques of the front motor Mf and the rear motor Mr are set based on the region determined at step S3. For example, in the case that the point representing temperature conditions of the front motor Mf and the rear motor Mr falls within the region A, the target torques of the front motor Mf and the rear motor Mr are set based on the target torque ratio. In the case that the point representing temperature conditions of the front motor Mf and the rear motor Mr falls within the region B, C, or F, the upper limit torque determiner 26 sets the upper limit torque of at least one of the front motor Mf and the rear motor Mr to the torque at the point when the point representing temperature conditions of the front motor Mf and the rear motor Mr enters the above-listed regions. In addition, the target torque determiner 28 sets the target torques of the front motor Mf and the rear motor Mr based on the required driving torque and the upper limit torque set by the upper limit torque determiner 26. In the case that the point representing temperature conditions of the front motor Mf and the rear motor Mr falls within the region D, E, or G, the limit torque determiner 27 sets the upper limit torque of at least one of the front motor Mf and the rear motor Mr to the limit torque when the point representing temperature conditions of the front motor Mf and the rear motor Mr enters the region D, E, or G. In addition, the target torque determiner 28 sets the target torques of the front motor Mf and the rear motor Mr based on the required driving torque and the upper limit torque.

At step S5, the front motor Mf and the rear motor Mr generate torques by controlling the power controllers PCrf, PClf, PCrr, and PClr based on the target torques of the front motor Mf and the rear motor Mr set at step S4.

As described above, the manual range mode is available in the vehicle Ve. In the manual range mode, the shift range may be manually shifted in response to the shifting operation. In other words, the required driving torque with respect to a predetermined position of the accelerator pedal may be changed manually. For example, when the driver performs the downshifting operation of the shifting device S, the required driving torque with respect to the predetermined position of the accelerator pedal increases stepwise. However, if the point representing temperature conditions of the front motor Mf and the rear motor Mr falls within the region F, the upper limit torques of the front motor Mf and the rear motor Mr are set to the torques at the point when the point representing temperature conditions enter the region F. In the case that the point representing temperature conditions falls within the region G, the upper limit torques of the front motor Mf and the rear motor Mr are set to the limit torques determined based on the temperatures of those motors Mf and Mr. That is, in the case that the point representing temperature conditions of the front motor Mf and the rear motor Mr falls within the region F or G, the torques of those motors Mf and Mr will not be increased greater than the torques at the point when the point representing temperature conditions of those motors Mf and Mr enters those regions. In other words, the driving torque to propel the vehicle Ve may not be increased in those cases.

At step S6, therefore, the temperature region determiner 25 determines whether the point representing temperature conditions of the front motor Mf and the rear motor Mr falls within the region F or G. If the point representing temperature conditions of the front motor Mf and the rear motor Mr falls within the region F or G so that the answer of step S6 is YES, the routine progresses to the step S7 to inhibit the downshifting of the shift range in the manual range mode, and thereafter the routine returns. By contrast, if the point representing temperature conditions of the front motor Mf and the rear motor Mr falls within the region other than F or G so that the answer of step S6 is NO, the routine returns. At step S7, the driver may be notified of such inhibition of the downshifting operation.

Thus, when the temperature of the front motor Mf exceeds the first predetermined temperature T1, the torque of the front motor Mf at that time is set as the upper limit torque of the front motor Mf. Likewise, when the temperature of the rear motor Mr exceeds the second predetermined temperature T2, the torque of the rear motor Mr at that time is set as the upper limit torque of the rear motor Mr. According to the embodiment of the present disclosure, therefore, it is possible to prevent a temperature rise of the front motor Mf or the rear motor Mr to the first predetermined temperature T1 or the second predetermined temperature T2 or higher. Otherwise, it is possible to reduce increasing rates of the temperatures of the front motor Mf and the rear motor Mr. For these reasons, the temperatures of the front motor Mf and the rear motor Mr will not be raised to the first restrictive temperature T3 and the second restrictive temperature T4.

In addition, when the temperature of the front motor Mf exceeds the first restrictive temperature T3, the torque of the front motor Mf at that time is also set as the upper limit torque of the front motor Mf. Likewise, when the temperature of the rear motor Mr exceeds the second restrictive temperature T4, the torque of the rear motor Mr at that time is set as the upper limit torque of the rear motor Mr. For example, when the required driving torque is increased, the temperature of one of the front motor Mf and the rear motor Mr gradually increases. In this situation, when the temperature of the front motor Mf exceeds the first predetermined temperature T1 or when the temperature of the rear motor Mr exceeds the second predetermined temperature T2, the torque of the motor whose temperature exceeds the predetermined temperature is fixed, and the torque of the other motor is gradually increased. Then, when the temperature of the front motor Mf exceeds the first restrictive temperature T3 or when the temperature of the rear motor Mr exceeds the second restrictive temperature T4, the torque of the motor whose temperature exceeds the restrictive temperature is reduced to the limit torque, and the torque of the other motor is continuously increased. Consequently, the ratio between the torques of the front motor Mf and the rear motor Mr gradually deviates from the target torque ratio from the point at which the temperature of the front motor Mf reaches the first predetermined temperature T1 or the temperature of the rear motor Mr reaches the second predetermined temperature T2. Thereafter, after the temperature of the front motor Mf reaches the first restrictive temperature T3 or the temperature of the rear motor Mr reaches the second restrictive temperature T4, the rate of change of the deviation is increased. Therefore, it is possible to prevent abrupt change in the torque of the front motor Mf and the torque of the rear motor Mr. As a result, reduction in the running stability of the vehicle Ve may be prevented.

The drive force control system for an electric vehicle according to the embodiment of the present disclosure may be further configured to set the torque of the rear motor Mr at that time when the temperature of the rear motor Mr rises to the second predetermined temperature T2 as the upper limit torque, in a case that the vehicle is operated in the two-wheel drive mode in which the rear motor Mr serves as a prime mover. In addition, the drive force control system for an electric vehicle according to the embodiment of the present disclosure may be further configured to shift the operating mode to the four-wheel drive mode to generate a shortage of the torque with respect to the required driving torque by the front motor Mf when the required drive torque to propel the vehicle Ve cannot be generated only by the rear motor Mr due to an increase in the required drive torque.

It is to be noted that the front motor Mf and the rear motor Mr are heated by copper loss, iron loss, or the like. That is, temperatures of the front motor Mf and the rear motor Mr are also raised when those motors generate regenerative braking torque. Therefore, the foregoing control may also be executed when braking the vehicle while regenerating energy. In this case, the upper limits of the regenerative torques of the front motor Mf and the rear motor Mr may be set in accordance with the temperature of the front motor Mf and the temperature of the rear motor Mr.

Further, the electric vehicle according to the embodiment of the present disclosure is not limited to the above-described hybrid vehicle Ve, and may also be applied to a so-called hybrid vehicle including a motor that drives any one pair of front wheels and the rear wheels, and an engine that drives the other pair of wheels. In this case, when a temperature of the motor is raised to or higher than a predetermined temperature, the torque of the motor at that time is set as the upper limit torque, and when the required driving torque is increased, the insufficient torque is generated by the engine.

What is claimed is:

1. A drive force control system for an electric vehicle, comprising:
   a first motor that drives a first wheel as one of a front wheel and a rear wheel; and
   another prime mover that drives a second wheel as the other one of the front wheel and the rear wheel;
   wherein a four-wheel drive mode in which the electric vehicle is propelled by the first motor and the another prime mover is available,
   the drive force control system comprises a controller that controls the first motor, and
   the controller comprises:
   an upper limit torque determiner configured to employ a torque of the first motor at a point when a temperature of the first motor reaches a first predetermined temperature as an upper limit torque of the first motor, in a case that the temperature of the first motor is equal to or higher than a first predetermined temperature but lower than a first restrictive temperature set to a level possible to protect the first motor;
   a restrictive torque determiner configured to employ a first limit torque that is smaller than the torque employed by the upper limit torque determiner and that is set in accordance with the temperature of the first motor, as the upper limit torque of the first motor, in a case that the temperature of the first motor is equal to or higher than the first restrictive temperature; and
   a target torque determiner configured to determine a torque of the another prime mover based on the upper limit torque of the first motor, a target torque ratio between a torque driving the front wheel and a torque driving the rear wheel to achieve a required driving torque to propel the electric vehicle, or the required driving torque.

2. The drive force control system for the electric vehicle as claimed in claim 1,
   wherein the another prime mover includes a second motor,
   the controller is further configured to control the second motor,
   the upper limit torque determiner is further configured to employ a torque of the second motor at a point when a temperature of the second motor reaches a second predetermined temperature as an upper limit torque of the second motor, in a case that the temperature of the second motor is equal to or higher than the second predetermined temperature but lower than a second restrictive temperature set to a level possible to protect the second motor, and
   the target torque determiner is further configured to employ the torque of the first motor at the point when the temperature of the first motor reaches the first predetermined temperature as the upper limit torque of the first motor, and employ the torque of the second motor at the point when the temperature of the second motor reaches the second predetermined temperature as the upper limit torque of the second motor, in a case that the temperature of the first motor is equal to or higher than the first predetermined temperature but lower than the first restrictive temperature and that the temperature of the second motor is equal to or higher than the second predetermined temperature but lower than a second restrictive temperature.

3. The drive force control system for the electric vehicle as claimed in claim 1, wherein the another prime mover includes a second motor, the controller is further configured to control the second motor, the restrictive torque determiner is further configured to employ a second limit torque that is set in accordance with a temperature of the second motor as an upper limit torque of the second motor, in a case that the temperature of the second motor is equal to or higher than a second restrictive temperature set to a level possible to protect the second motor, and the target torque determiner is further configured to employ the first limit torque as the upper limit torque of the first motor, and employ the second limit torque as the upper limit torque of the second motor, in a case that the temperature of the first motor is equal to or higher than the first restrictive temperature and that the temperature of the second motor is equal to or higher than the second restrictive temperature.

4. The drive force control system for the electric vehicle as claimed in claim 1, wherein the another prime mover includes a second motor, the controller is further configured to control the second motor, a manual range mode in which the required driving torque is determined based on a shift range selected from a plurality of ranges is available, the electric vehicle further comprises a shifting device that is operated by a driver to select the shift range in the manual range mode, and the controller is further configured to inhibit a shifting operation of the shift range to increase the required driving torque in the manual range mode, in a case that the temperature of the first motor is equal to or higher than the first predetermined temperature and that the temperature of the second motor is equal to or higher than a second predetermined temperature that is lower than a second restrictive temperature set to a level possible to protect the second motor.

* * * * *